April 8, 1924.
J. F. GILCHRIST
GEARING FOR OPERATING ROTARY DRIVEN KITCHEN UTENSILS
Filed Jan. 21, 1922
1,489,242
2 Sheets-Sheet 1
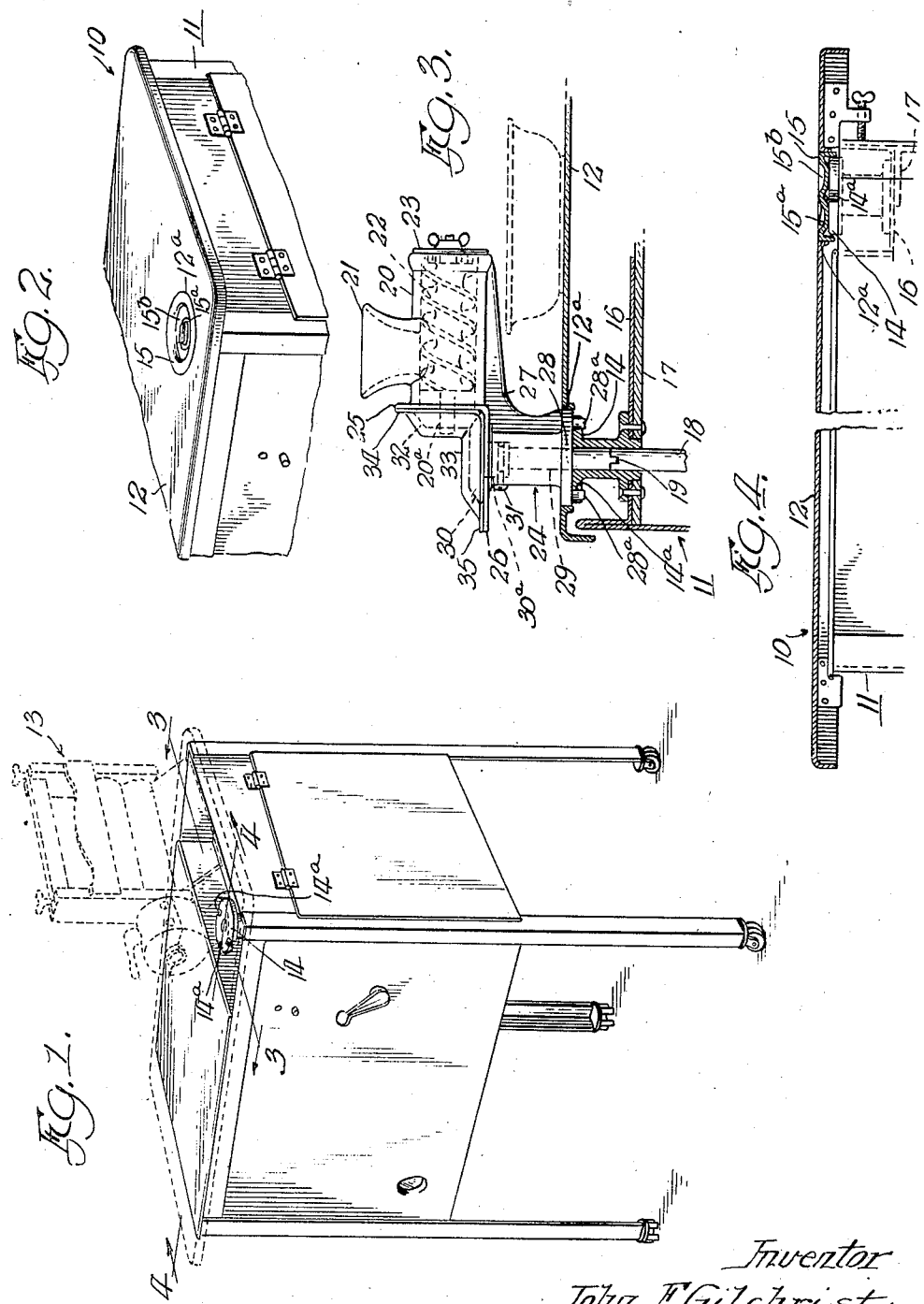
Inventor
John F. Gilchrist
by Clarence E. Mehlhope Atty.

April 8, 1924.
J. F. GILCHRIST
1,489,242
GEARING FOR OPERATING ROTARY DRIVEN KITCHEN UTENSILS
Filed Jan. 21, 1922  2 Sheets-Sheet 2
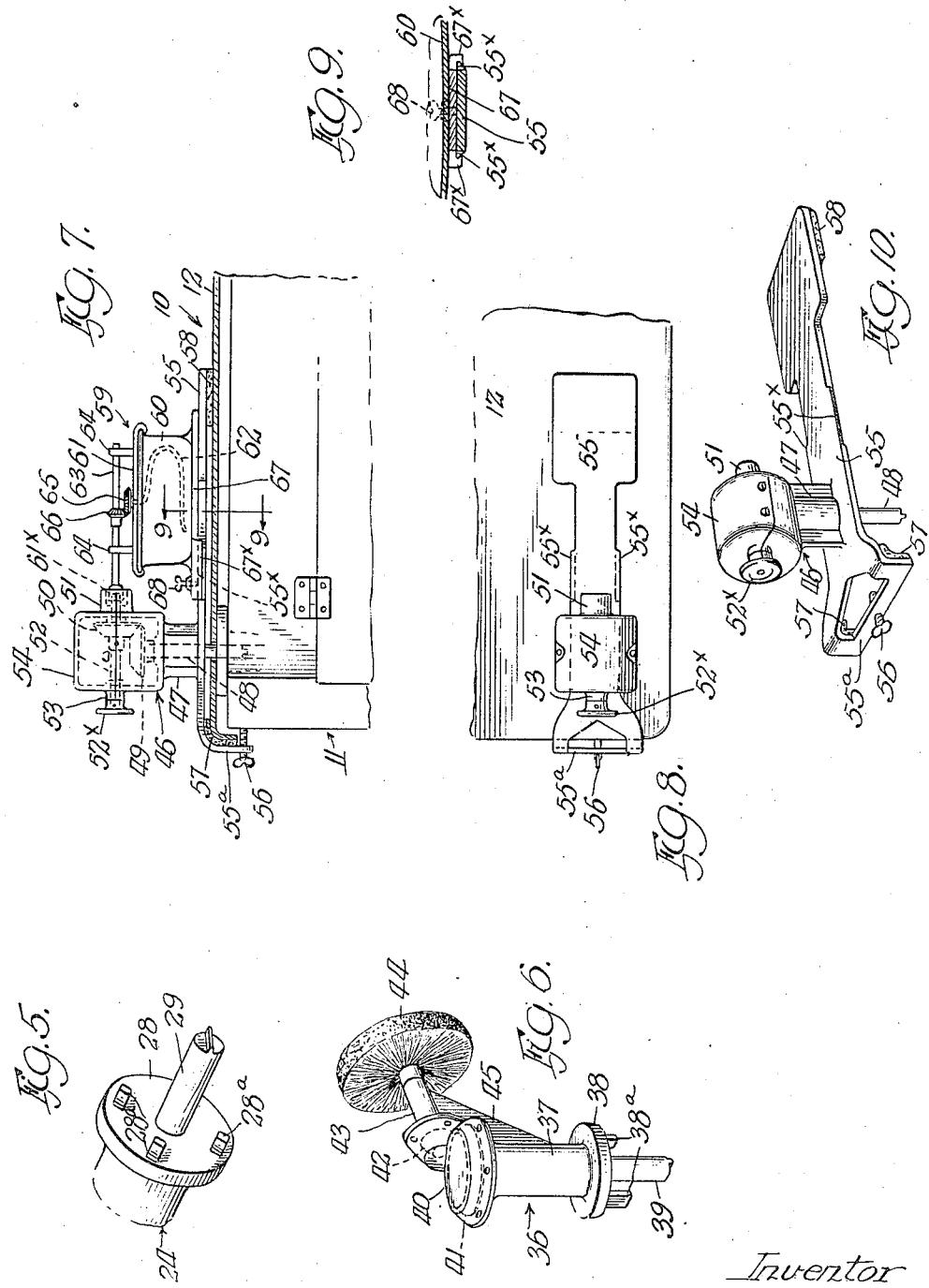
Inventor
John F. Gilchrist
by Clarence E. Mehlhope Atty.

Patented Apr. 8, 1924.

1,489,242

UNITED STATES PATENT OFFICE.

JOHN F. GILCHRIST, OF CHICAGO, ILLINOIS, ASSIGNOR TO FEDERAL ELECTRIC COMPANY, OF CHICAGO, ILLINOIS, A CORPORATION OF ILLINOIS.

GEARING FOR OPERATING ROTARY-DRIVEN KITCHEN UTENSILS.

Application filed January 21, 1922. Serial No. 530,912.

*To all whom it may concern:*

Be it known that I, JOHN F. GILCHRIST, a citizen of the United States, and a resident of Chicago, county of Cook, and State of Illinois, have invented certain Improvements in Gearing for Operating Rotary-Driven Kitchen Utensils; and I do hereby declare that the following is a full, clear, and exact description thereof, reference being had to the accompanying drawings, and to the letters of reference marked thereon, which form a part of this specification.

This invention relates to improvements in gearing for operating rotary driven kitchen utensils and consists of the matters hereinafter described and more particularly pointed out in the appended claims.

The object of the invention is to provide a novel gearing for the familiar rotary driven kitchen utensils, together with attachments by means of which they may be mounted upon a power driven washing machine having a table top and by which they may be easily coupled to the vertical shaft which normally drives the wringer.

The improved gearing is particularly adapted for use with the combined washing machine and table described in an application for Letters Patent filed by me on October 27th, 1921, Serial No. 510,938. The advantages of my invention will appear more fully as I proceed with my specification.

In the drawings:—

Figure 1 is a perspective view of the type of combined washing machine and table with which the improved gearing and the utensils operated thereby are designed to be used.

Figure 2 is a partial perspective view of the same when used as a table.

Figure 3 is a partial, vertical sectional view through the washing machine in the plane of the upright shaft which drives the wringer, with a rotary kitchen utensil mounted on the table and operatively connected by the improved gearing to said shaft, the plane of the section being indicated by the line 3—3 of Fig. 1.

Figure 4 is a partial vertical section through the table top, without the utensil thereon, the plane of the section being indicated by the line 4—4 of Fig. 1.

Figure 5 is a perspective view of the base of the utensil, looked at from the bottom.

Figure 6 is a perspective view of a kitchen utensil of another kind connected to the novel gearing.

Figure 7 is a sectional, side elevation, showing a modified form of the invention.

Figure 8 is a top plan view of Fig. 7 with the operating part of the utensil removed.

Figure 9 is a transverse section through Figure 7 in a plane indicated by the line 9—9 of Fig. 7.

Figure 10 is a perspective view of the utensil attachment as it appears when removed from the table.

Referring now to that embodiment of the invention illustrated in the accompanying drawings: 10 indicates a combination washing machine and table (see Figures 2 and 3), which is preferably of the kind described in my application hereinbefore referred to. 11 indicates the washing machine body and 12 a table top, which is applied and secured to the top of the washing machine body after the wringer 13, shown in dotted lines in Figure 1, is removed from a boss 14 upon which it is normally mounted when the device is being operated as a washing machine. When the wringer is removed and the table top is applied the table top covers the boss 14; but the table top is provided with a hole 12$^a$ in the part above said boss, said hole being normally closed by a cover or closure 15, which fits snugly within the hole and which carries a hinged ring 15$^a$ by means of which it may be withdrawn,— the ring being normally folded down into a recess 15$^b$ in the top of the cover, so as to be out of the way.

The boss 14 is mounted on the usual drip board 16, which is supported by an angle bar 17 fixed transversely on the end wall of the washing machine body. Said boss is apertured and provides a bearing for the top end of a vertical shaft 18 (see Figure 3) which drives the wringer and which has a transverse notch 19 to receive a diametric rib on a short shaft, which is directly coupled to and drives the wringer,—said short shaft being withdrawn when the wringer is removed from the boss 14. The boss itself is provided with arcuately spaced notches to receive a latch on the rotative base of the swinging wringer to lock said wringer in various positions in a well-known manner.

The kitchen utensil may be any one of the several rotary driven devices of the kinds well-known to housewives. In Figure 3 is shown the familiar food chopper. This consists of a closed-end barrel-like body 20, into the top of which opens a funnel-like hopper 21, and of a rotary feed screw 22 which carries the food towards one end of the body, which is perforated, and through the perforations of which the food is forced—a disc 23 with radial blades, rotating with the feed screw and cutting the particles forced through the perforated end of the body.

In embodying the invention in connection with such a device as shown in Figure 3, the barrel 20 is made integral with or fixed to an upright casing 24 from which it is offset horizontally, the two being connected by an upright plate 25 which provides the rear end wall of the chopper barrel and by a horizontal plate 26 at the top of the casing. 27 indicates a reinforcing and supporting rib connecting the casing and the barrel. The casing 24 has a horizontal base 28 which is adapted to rest upon the boss 14 of the washing machine,—said base having arcuately spaced, depending detents 28$^a$ which are adapted to engage in the notches 14$^a$ of the boss 14 and hold said base against rotation on the boss. The casing 24 and base 28 thus provide an upright standard which, in this case, forms the support for the utensil.

The casing 24 has a vertical bearing aperture for a short shaft 29, which depends below the base 28. The bottom end of the shaft 29 has a diametric rib adapted to engage in the diametric notch at the top of the shaft 18 of the washing machine. 30 indicates a bevel gear fixed to the top of the shaft 29,—the bearing aperture for said shaft being enlarged near the top to receive the hub 30$^a$ of said gear. The gear and shaft are locked against movement in the direction of the length of the shaft by means of a set-screw 31 which takes through the wall of the casing and engages a suitable annular groove in the hub 30$^a$ of the gear 30.

32 indicates a second bevel gear in mesh with the gear 30 and fixed on the shaft 20$^a$ of the screw 22 of the chopper, which projects outside the rear end wall of the barrel for the purpose. 33 indicates an angular hollow shell or cover having an upright compartment to enclose the gear 32 and a horizontal compartment to enclose the gear 30. Said shell has an upright base 34 and a horizontal base 35 adapted to close against and to be attached to the plates 25 and 26 respectively.

The base 28 of the casing is made of such size as to fit snugly within the hole 12$^a$ in the table top. Thus when the utensil is applied with its base 28 on the boss 14 and with the detents 28$^a$ of said base engaged in the notches 14$^a$ on the boss and with the depending part of the shaft 29 engaged in the bearing opening in the boss and the complementary ends of the shafts 29 and 18 locked together, the utensil will be retained in proper position and its screw will be operatively connected to the power-driven shaft 18.

Manifestly any other rotary driven kitchen utensil may be used in connection with the invention in the same way and may be made a part of or fixed to a similar standard with its casing 24 and its enclosed gears and shaft 29. For example in Figure 6, the invention is shown embodied in a rotary polisher. 36 indicates as a whole the upright standard comprising the casing 37 which provides bearing for the upright shaft 39 and which has a base 38 with the depending lugs 38$^a$ for locking said base to the boss 14. 40 indicates the angular cover for the intermeshing enclosed gears 41, 42; and 43 indicates the horizontal barrel in which the rotary driven member of the utensil has bearing,—said driven member in this case being a shaft to which is connected a rotary polishing brush 44. The connection of the barrel 43 to the casing 37 is reinforced as before by means of a rib 45.

Instead of making the upright standard integral or fixed to the barrel or other bearing member of the rotary utensil, it may be made separate, as shown in Figures 7 to 10 inclusive.

In this case 46 indicates the standard comprising the upright casing 47, providing the bearing for the vertical shaft 48 and the housing for the intermeshing gears 49, 50; and 51 indicates a short horizontal barrel integral with or fixed to said casing and providing bearing for a horizontal shaft 52 which is adapted for driving the rotor of the utensil. In this instance the casing is formed at the top so as to provide an additional bearing for the shaft 52, as at 53,—54 indicating the hollow cover which closes the housing for the gears.

The standard 47 is fixed to and mounted on an elongated base 55 which is adapted to rest on the table top. Said base has at one end a depending flange 55$^a$ which is adapted to engage against the edge of the table top,—a thumb-screw 56 being threaded through said flange for locking engagement against the body of the washing machine, below the table top. Pads 57 and 58 are preferably secured to the base 54 at or near its ends to prevent it from marring the surface of the table top.

59 indicates the utensil which, as shown is a cake mixer comprising a vessel 60, a cross-bar 61, a rotary mixing arm 62 journalled in the cross-bar, and a horizontal shaft 63 mounted in bearing lugs 64 on the cross-bar and connected by gears 65, 66 to the said rotary arm. The utensil has a base 67 which is adapted to rest on the base 55, and the two bases have inter-engaging, counter-beveled flanges 55ˣ, 67ˣ (see Fig. 9), by means of which the base of the utensil may be moved into locking engagement on the base 55 when in a position closely adjacent to the standard 47. The two shafts 61 and 52 are provided at their proximate ends with interlocking members, 61ˣ, so that they may be locked non-rotatively together when they are brought to end engagement, the shaft 52 being provided with a hand wheel 52ˣ for slightly adjusting said shaft rotatively to bring its coupling member into register with the coupling member on the shaft 61 of the utensil. A locking thumb screw 68 is provided on the base 67 of the utensil for engagement with the main base 55, for locking the utensil rigidly on said base.

The advantages of the novel gearing will be manifest to those familiar with kitchen utensils. By its use, the drudgery and hard work involved in the operation of such utensils, which is apt to lead a housewife to stick to primitive and antiquated practices intended to be displaced by said utensils, is entirely dispensed with and the utensils are made readily and quickly connectible to that now almost universal household equipment—a power-driven washing machine.

While in describing my invention I have referred to many details of mechanical construction and arrangement, it is to be understood that the invention is not limited thereby, except as may be pointed out in the appended claims.

I claim:—

1. In combination with a support, a vertical drive shaft journalled in the support, and a table top adapted to be removably attached to the support above the drive shaft, the table top having an aperture coaxial with the drive shaft, a standard removably mounted on the support and comprising a base and a gear case providing bearing for an upright shaft and a horizontal shaft in the vertical plane of the upright shaft, intermeshing bevel gears on said horizontal and upright shafts, within the gear case, the horizontal shaft being adapted for the operation of the rotary member of a kitchen utensil, while the upright shaft is adapted to extend through the aperture in the table top and to be operatively connected to the vertical drive shaft on the support, and means carried by the standard for engaging fixed parts of the support for preventing rotation of said standard.

2. In combination with a support, a vertical drive shaft journalled in the support, and a table top adapted to be removably attached to the support above the drive shaft, the table top having an aperture coaxial with the drive shaft, a standard removably mounted on the support, a driven shaft journalled in the standard and adapted to be entered through the aperture in the table top and to be operatively connected to the upright drive shaft in the support, the standard extending into a plane above the table top, means carried by the standard for engaging fixed parts of the support for preventing rotation of said standard, and a kitchen utensil mounted on the standard so as to be operatively connected with the driven shaft in the standard.

In testimony that I claim the foregoing as my invention, I affix my signature, this 18th day of January, A. D. 1922.

JOHN F. GILCHRIST.

Witnesses:
CLARENCE E. MEHLHOPE,
T. H. ALFREDS.